(12) United States Patent
Ito

(10) Patent No.: US 8,593,294 B2
(45) Date of Patent: Nov. 26, 2013

(54) DATA TRANSFER APPARATUS

(75) Inventor: Kuniaki Ito, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 306 days.

(21) Appl. No.: 13/049,342

(22) Filed: Mar. 16, 2011

(65) Prior Publication Data

US 2012/0068850 A1    Mar. 22, 2012

(30) Foreign Application Priority Data

Sep. 21, 2010  (JP) .................................. 2010-210614

(51) Int. Cl.
*G08B 21/00* (2006.01)

(52) U.S. Cl.
USPC .................... 340/669; 340/691.6; 340/825.21

(58) Field of Classification Search
USPC .............. 340/669–670, 675, 683, 686.4, 692, 340/691.6, 3.62, 3.54, 3.7, 825.21–825.26, 340/5.22
See application file for complete search history.

(56) References Cited

U.S. PATENT DOCUMENTS

| | | | | |
|---|---|---|---|---|
| 5,438,428 | A * | 8/1995 | Itoh ............................... | 358/436 |
| 5,531,600 | A * | 7/1996 | Baer et al. ..................... | 434/317 |
| 5,692,155 | A * | 11/1997 | Iskiyan et al. ................. | 711/162 |
| 7,571,486 | B2 * | 8/2009 | Lam ................................ | 726/26 |
| 8,139,943 | B2 * | 3/2012 | Asukai et al. ................. | 398/118 |
| 2007/0129959 | A1 * | 6/2007 | Bransky et al. .................... | 705/1 |
| 2011/0214090 | A1 * | 9/2011 | Yee et al. ....................... | 715/838 |

FOREIGN PATENT DOCUMENTS

| | | |
|---|---|---|
| JP | 11-213112 | 8/1999 |
| JP | 2005-339002 | 12/2005 |
| JP | 2006-134291 | 5/2006 |
| JP | 2007-166143 A | 6/2007 |
| JP | 2008-34961 A | 2/2008 |
| JP | 2008-243196 | 10/2008 |
| JP | 4242856 | 1/2009 |
| JP | 2009-134493 | 6/2009 |
| JP | 2009-230607 | 10/2009 |
| JP | 2010-67060 A | 3/2010 |

OTHER PUBLICATIONS

Office Action issued Sep. 11, 2012 in Japanese Patent Application No. 2010-210614 with English language translation.

* cited by examiner

*Primary Examiner* — Daniel Previl
(74) *Attorney, Agent, or Firm* — Oblon, Spivak, McClelland, Maier & Neustadt, L.L.P.

(57) ABSTRACT

According to embodiments, a storage device, which has a wireless communication processing part providing a wireless communication function and a memory, includes an acceleration sensor, a buzzer, and a control part which detects a user's operation based on acceleration information output from the acceleration sensor and determines whether or not a file management operation including access to the memory is started and whether or not the buzzer is rung.

18 Claims, 6 Drawing Sheets

DATA TRANSFER APPARATUS

CROSS-REFERENCE TO RELATED APPLICATIONS

This application is based upon and claims the benefit of priority from Japanese Patent Application No. 2010-210614, filed on Sep. 21, 2010; the entire contents of which are incorporated herein by reference.

FIELD

Embodiments described herein relate generally to a storage device.

BACKGROUND

Recently, a digital camera and a digital video camera are provided with an interface, which is used for attaching an external storage device such as a memory card, in order to make up for shortage of capacity of an internal storage device (built-in memory) and in order to take out data of taken images and easily move the image data to other equipment. Likewise, in a portable telephone, a portable music player, a portable game machine, and the like, it has become more common to adopt a constitution allowing attachment of an external storage device.

Meanwhile, as the equipment that can use the above external storage device increases and realizes high functionality, the storage device is improved, so that the capacity is increased, and the functions are enhanced. For example, there has been known a storage device which is provided with a wireless communication module and can be directly connected to a communication network through wireless communication.

Since a storage device such as a memory card is used by being connected to various equipment, the storage device is required to have such a high versatility that the storage device can be used in the same way even though the storage device is connected to any equipment. It is preferable that functions newly added to the storage device with the realization of high functionality can be used regardless of combination of equipment.

DETAILED DESCRIPTION

According to embodiments, a storage device, which has a wireless communication processing part providing a wireless communication function and a memory, includes an acceleration sensor, a buzzer, and a control part which detects user's operation based on acceleration information output from the acceleration sensor, determines whether or not a file management operation including access to the memory is started, and, at the same time, determines whether or not the buzzer is rung.

Exemplary embodiments of a storage device will be explained below in detail with reference to the accompanying drawings. The present invention is not limited to the following embodiments.

First Embodiment

Figure 1:
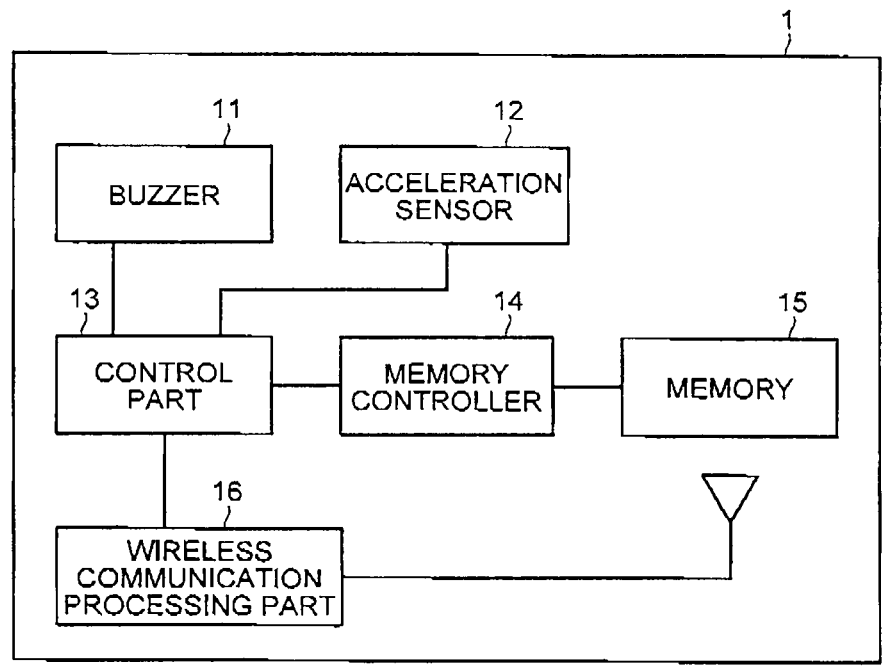
FIG. 1 is a view showing a configuration example of a storage device of a first embodiment.

FIG. 1 is a view showing a configuration example of a storage device of a first embodiment. As illustrated, a storage device 1 of the present embodiment is provided with a buzzer 11, an acceleration sensor 12, a control part 13, a memory controller 14, a memory 15, and a wireless communication processing part 16.

In the storage device 1, the buzzer 11 generates a beep sound with a specified rhythm in accordance with an instruction from the control part 13. The acceleration sensor 12 measures the acceleration generated with user's operation and so on. The control part 13 controls the buzzer 11, the memory controller 14, and the wireless communication processing part 16 based on acceleration information output from the acceleration sensor 12. The memory controller 14 controls the memory 15 in accordance with the instruction from the control part 13 and executes reading, writing, and deleting of data. As the memory 15, a NAND-type flash memory can be used, for example. The memory 15 stores user data and the like received through the memory controller 14. The wireless communication processing part 16 provides a function of performing wireless communication with other equipment having a wireless communication function, such as another storage device and a communication device.

Figure 2:
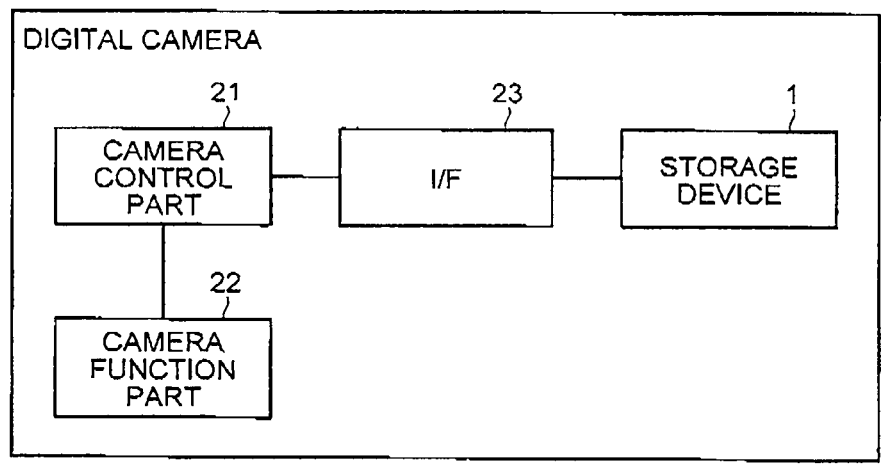
FIG. 2 is a view showing a usage example of the storage device.

The storage device 1 of the present embodiment is an SD memory card, for example, and, as shown in FIG. 2, is used by being mounted in a digital camera. The illustrated digital camera is a general digital camera and is configured to include a camera control part 21 which controls various components (not shown) in the camera, a camera function part 22 which performs photographing and image processing, and an interface (I/F) 23 for connecting an external storage device to the camera. Namely, the storage device 1 can be used in all digital cameras including an interface to which the storage device 1 as an external storage device can be connected. Although FIG. 2 shows an example in which the storage device 1 is used in the digital camera, the storage device 1 can be used in other devices (such as a digital video camera and a portable telephone).

Next, the operation of the storage device 1 will be described. As one example, the operation in such a state that the storage device 1 is mounted in a digital camera will be described.

The storage device 1 performs wireless communication between the device itself and another storage device having the same constitution. The storage device 1 is different from a conventional general storage device in that the storage device 1 executes a file management operation including processing of sending a file (data) stored in the memory 15 to another storage device and processing of receiving a file stored in another storage device. Further, as a feature of the storage device 1, the file sending and receiving processing executed in the file management operation (the processing includes wireless communication processing accompanying the file sending and receiving processing) is determined in response to the measurement results of the acceleration sensor 12, and, that is, a user is allowed to select desired processing by utilizing the acceleration sensor 12. When a user operates the storage device 1 (in a strict sense, a digital camera mounted with the storage device 1, for example), a detection result of the acceleration sensor 12 is different according to the user's operation; therefore, the processing of sending a file toward another storage device or the processing of receiving a file sent from another storage device is started according to the detection result. "To operate the storage device 1" includes that the storage device 1 is actually moved and the storage device 1 (digital camera) is lightly tapped with fingers. All operations are included as long as the operations can be detected by the acceleration sensor 12. In the following description, predetermined operations that can be detected by the acceleration sensor 12 are collectively referred to as "tapping".

Figure 3:
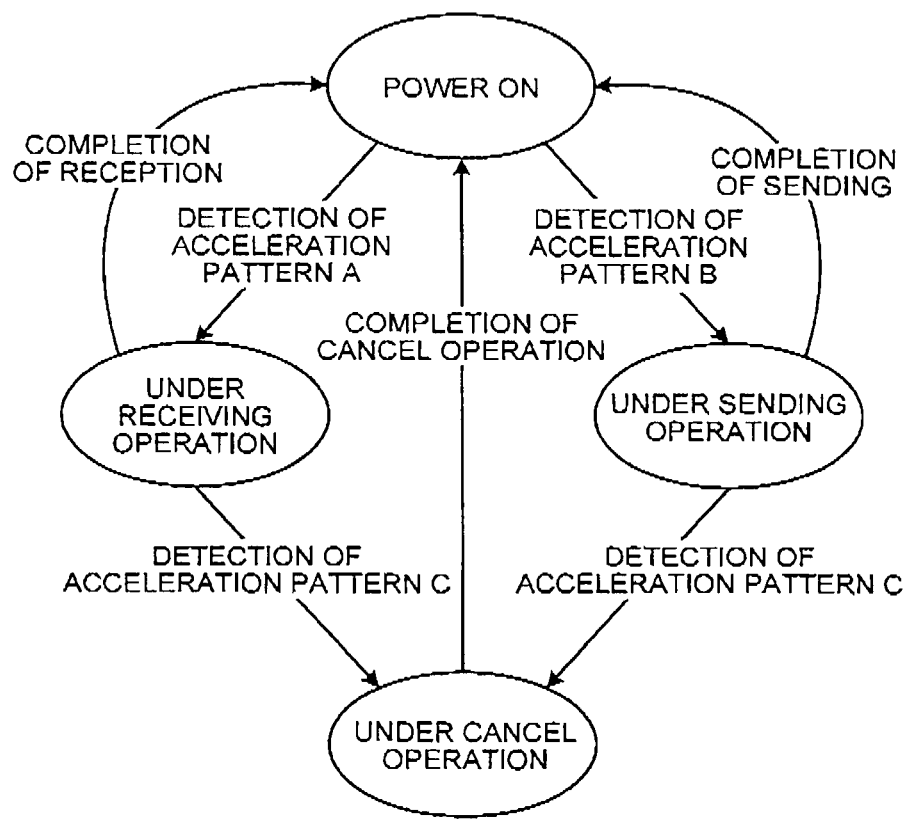
FIG. 3 is a state transition diagram of the storage device.

FIG. 3 is a view (state transition diagram) showing one example of a state transition of the storage device 1. As shown in FIG. 3, the storage device 1 detects the tapping in a power ON state. When it is determined that the detected tapping corresponds to an acceleration pattern A (for example, when the tapping is detected twice within a predetermined time), the storage device 1 shifts to a state under a receiving operation to start a file receiving operation. Meanwhile, when it is determined that the detected tapping corresponds to an acceleration pattern B (for example, when the tapping is detected three times within a predetermined time), the storage device 1 shifts to a state under a sending operation to start a file sending operation. The power ON state corresponds to none of the state "under receiving operation", the state "under sending operation", and the state "under cancel operation" shown in FIG. 3. In the power ON state, tapping showing the start of the file receiving operation or tapping instructing the start of the file sending operation is being waited. Meanwhile, when tapping corresponding to an acceleration pattern C is detected during the receiving operation or the sending operation (for example, when the tapping is detected four times within a predetermined time), the storage device 1 shifts to a state under a cancel operation to cancel a running operation (the file sending operation or the file receiving operation). After the operation to be cancelled is terminated, the storage device 1 shifts to the power ON state. The storage device 1 also shifts to the power ON state upon the completion of the reception and sending of a file.

The method of determining the acceleration pattern (tapping pattern) is not specified especially. The acceleration pattern may be determined by the number of times of the tapping detected within a predetermined time, or time from when certain tapping is detected till when the next tapping is detected may be utilized. For example, when the next tapping is detected before the lapse of a certain time (for example, 1 second) from the detection of the first tapping, the count value of the number of times of tapping is counted up. Further, when the next tapping is detected before the lapse of 1 second from the detection of the second tapping, the count value is counted up as three. Likewise, when the next tapping is detected before the lapse of 1 second from the detection of tapping, the count value is counted up, and when 1 second has elapsed from the detection of the tapping, the count value at that point of time is handled as the number of times of tapping. When the count value reaches the specified upper limit, the value is reset.

In the storage device 1, in the operation state (in the following description, the "operation state" may be described as an "operation mode") other than the power ON state shown in FIG. 3, a beep sound with rhythms different for each operation state is generated so that a user can recognize the operation being executed. In the present embodiment, the beep sound is generated by the buzzer, whereby the operation state of the storage device 1 is notified to the user. However, if a circuit generating a sound can be mounted in the storage device 1, the operation state may be notified to the user by the sound instead of the beep sound.

A specific operation example of the storage device 1 of the present embodiment is shown below.

Figure 4:
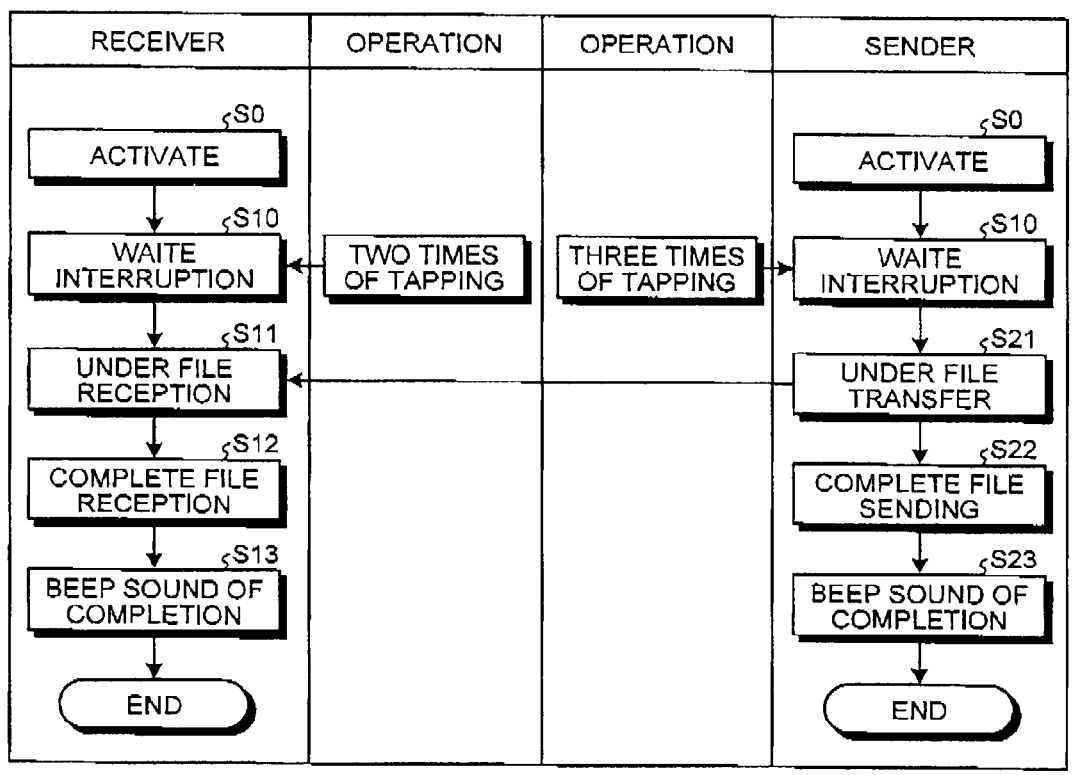
FIG. 4 is a sequence diagram showing an operation example of the storage device of the first embodiment.

FIG. 4 is a sequence diagram showing an operation example of the storage device 1 of the first embodiment. More specifically, FIG. 4 shows an example of an operation sequence when a file is sent and received between the two storage devices 1. One of the two storage devices 1 is operated as the file sending side, and the other one is operated as the file receiving side. The two storage devices 1 are assumed to be located at a position allowing wireless communication.

In the two storage devices 1, for example when a digital camera mounted with the storage devices 1 are powered on, the storage devices 1 are activated to be held in an interruption waiting state (corresponding to the power ON state shown in FIG. 3) and starts monitoring of the operation (tapping) executed by a user (steps S0 and S10).

In the interruption waiting state, a user of the storage device 1 on the file receiving side (hereinafter referred to as a storage device R) executes a specified operation (two times of tapping in the example of FIG. 4) to start the file receiving operation. When the storage device R detects two times of tapping, the storage device R shifts to a state under file reception and waits for sending of a file (step S11). At that time, a beep sound with a ringing pattern (rhythm) showing that the storage device R is in the state under file reception is generated from the buzzer 11. After the storage device R shifts to the state under file reception, the monitoring of the presence of the tapping by the user is continued. When tapping instructing canceling (for example, four times of tapping) is detected, the file receiving operation being executed is cancelled, and the storage device R shifts to the interruption waiting state (the power ON state in FIG. 3).

Meanwhile, a user of the storage device 1 on the file sending side (hereinafter referred to as a storage device S) executes a specified operation (three times of tapping in the example of FIG. 4) to start the file sending operation. When the storage device S detects three times of tapping, the storage device S shifts to a state under file transfer to start to transfer a file (step S21). At that time, a beep sound with a ringing pattern showing that the storage device S is in the state under file transfer is generated from the buzzer 11. After the storage device S shifts to the state under file transfer, the monitoring of the presence of the tapping by the user is continued. When the tapping instructing canceling is detected, the operation being executed is cancelled, and the storage device S shifts to the interruption waiting state (the power ON state in FIG. 3).

A file is transferred by wireless communication. The sequence from the start of file transfer operation to the completion of file transfer is not specified especially; however, for example after a wireless link is established between the storage device S (sending side) and storage device R (receiving side), the storage device S notifies the start of file transfer to the storage device R, and when the storage device S receives a response to the notification, the storage device S starts the file transfer. In the storage device S, a user previously selects a file to be transferred from the files stored in the memory 15, and the storage device S may send the selected file.

In the storage device R, when the reception of the file sent from the storage device S is completed (step S12), the fact is notified to the storage devices. The storage device R generates a beep sound showing the completion of the reception of the file (step S13), and the state under file reception is terminated. After the termination, the storage device R shifts to the power ON state. The received file is written in the memory 15.

When the storage device S receives, from the storage device R, the notification showing the completion of the reception of the file sent from the storage device S, the storage device S determines that the file transfer is completed and generates a beep sound showing the fact (steps S22 and S23) to terminate the state under file transfer. After the termination, the storage device S shifts to the power ON state.

In the above description, the operation of bringing one of the two storage devices 1 into the state under file reception is performed before the operation of bringing the other storage device 1 into the state under file transfer; however, these operations may be reversely performed. Namely, the operation of bringing one storage device into the state under file transfer may be performed before the operation of bringing the other storage device into the state under file reception.

As described above, in the storage device 1 of the present embodiment, the user's operation (tapping) is detected by the acceleration sensor 12. When the acceleration information (tapping pattern) showing the detection result coincides with one of previously specified acceleration patterns, the corresponding operation is executed to perform the file sending and receiving operation. Further, the beep sound is generated with the ringing pattern corresponding to the operation to be executed. According to this constitution, a user can transfer a file from one of the two storage devices 1 capable of wireless communication to the other one by a simple operation, and the convenience of the storage device 1 and equipment utilizing the storage device 1 can be enhanced. Further, a user can recognize the operation state of the storage device 1 with a sound, so that an erroneous operation can be prevented.

Second Embodiment

The storage device described in the first embodiment is operated so as to shift to a waiting state for receiving a file and thereafter surely receive a file sent from another storage device. Meanwhile, a storage device of the present embodiment determines whether a sent file is a desired file to be received, and when the sent file is the file to be received, the storage device receives the file actually. Further, in the present embodiment, the storage device does not send a file to a desired terminal and sends a file only to a desired storage device. The constitution of the storage device is the same as the constitution of the storage device of the first embodiment (see, FIG. 1).

In the storage device 1 of the present embodiment, a plurality of acceleration patterns (tapping patterns) as a start trigger of the file receiving and sending operation are provided, and different operations are performed according to the tapping pattern detected by an acceleration sensor 12. According to this constitution, the receiving side is prevented from receiving a file from an unintended person (erroneous file reception), and the sending side is prevented from sending a file to an unintended person (erroneous file transmission). To put it simply, when combination of the tapping pattern detected by the storage device on the receiving side and the tapping pattern detected by the storage device on the sending side is a previously specified correct combination, the storage device 1 is operated to transfer a file correctly. In order to realize the operation, the storage device 1 holds N (N is an integer not less than 2) kinds of parameter information in the case where the storage device 1 is operated as the receiving side and N kinds of parameter information in the case where the storage device 1 is operated as the sending side. Those parameter information may be written in a predetermined region of the memory 15 or in a storage part (not shown) other than the memory 15. The acceleration pattern as a trigger of the start of reception and the parameter in the case where the storage device 1 is operated as the receiving side are corresponded one to one to each other. The acceleration pattern as a trigger of the start of sending and the parameter in the case where the storage device 1 is operated as the sending side are corresponded one to one to each other. As in the first embodiment, a beep sound with ringing patterns different for each operation is generated from the buzzer 11 during execution of each operation. Namely, the acceleration pattern and the ringing pattern of the buzzer 11 are corresponded one to one to each other.

Figure 5:
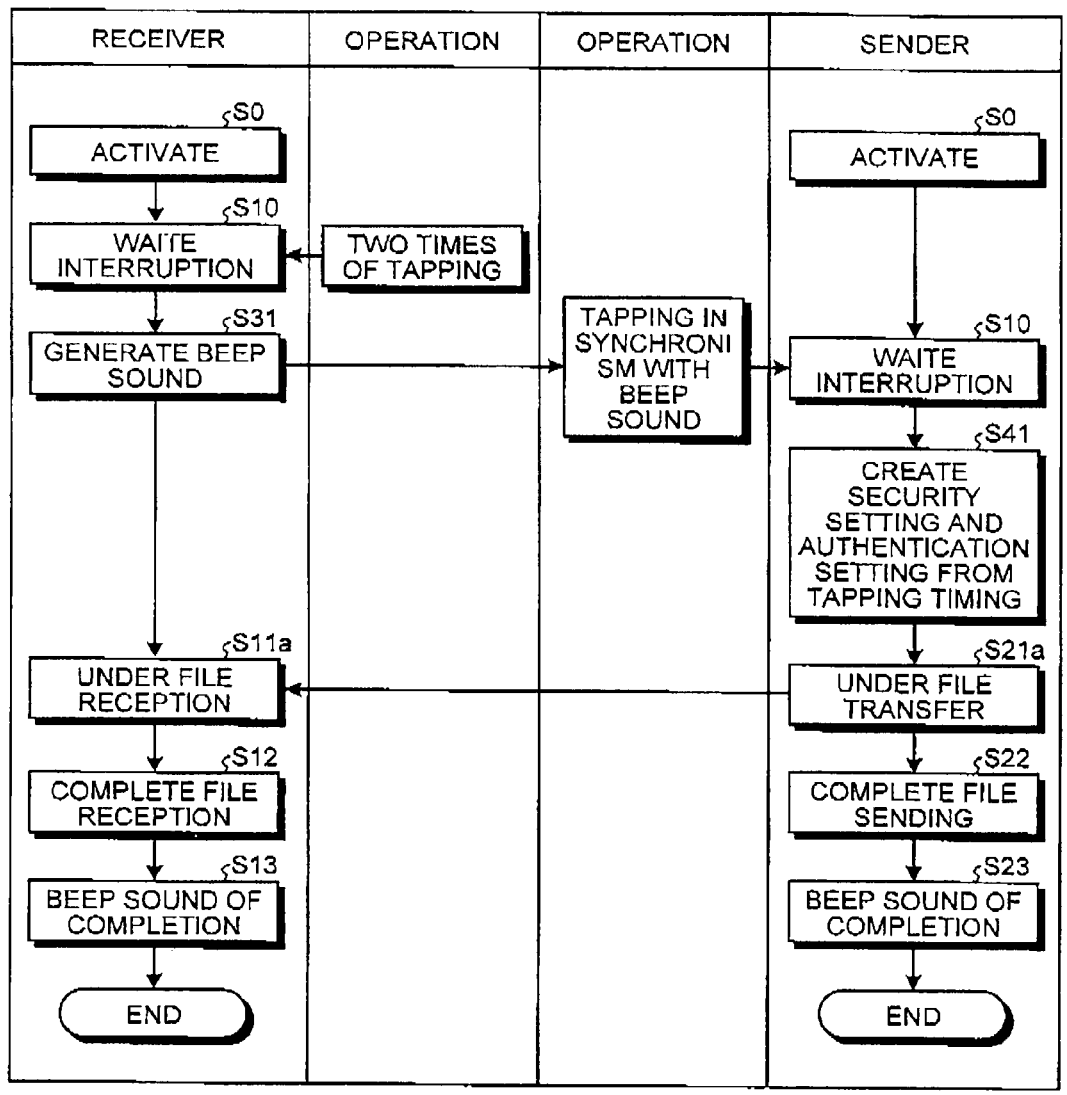
FIG. 5 is a sequence diagram showing an operation example of a storage device of a second embodiment.

FIG. 5 is a sequence diagram showing an operation example of the storage device 1 of the second embodiment. The processing similar to that in the sequence described in the first embodiment (see, FIG. 4) are assigned the same step numbers, and the description will be omitted. As in the first embodiment, the storage device 1 on the receiving side is referred to as the storage device R, and the storage device 1 on the sending side is referred to as the storage device S, whereby the two storage devices 1 are distinguished. The present embodiment is different from the first embodiment, and the storage device R operated as the receiving side starts the receiving operation before the storage device S.

When the storage device R detects one of a plurality of acceleration patterns showing the start of the operation as the receiving side (for example, two times of tapping), a beep sound with a ringing pattern corresponding to the detected acceleration pattern is generated (step S31).

A user of the storage device S performs tapping in synchronism with the beep sound from the storage device R (performs tapping with the same pattern as the ringing pattern). When the storage device S detects the tapping, the storage device S performs security setting (such as setting of various parameters for encoding communication) and authentication setting (setting of a password for authentication), using the parameter information corresponding to the detected tapping pattern (step S41) and transfers a file (step S21a). At that time, a beep sound with a ringing pattern showing that the storage device S is in a state under file sending is generated. When the user performs tapping that is not synchronized with the beep sound, the storage device S does not perform any operation (maintains the interruption waiting state), or if the detected tapping pattern happens to coincide with one of specified tapping patterns, the storage device S executes the operation corresponding to the coincident tapping pattern (including not only the sending operation but also the receiving operation). However, even if the sending operation is executed, the setting different from that in the storage device R is used in this case, and therefore, the receiving side (storage device R) does not receive the transferred file. Alternately, the sending side (storage device S) does not start the file transfer. The beep sound generated when the storage device 1 of the present embodiment starts the receiving operation is used for notifying the operation state to the user on the receiving side and designating the operation mode for the user of the storage device 1 on the sending side.

The storage device R receives a file using a parameter corresponding to the tapping pattern (two times of tapping) detected in step S10. When the sent file is a file sent using desired setting (security setting and authentication setting), the file is received normally, and when the reception of the file is completed, the beep sound showing the fact is generated to terminate the state under file reception (steps S11a, S12, and S13). When the file reception is completed, the fact that the file reception is completed is notified to the storage device S as in the first embodiment. After the ringing of the buzzer 11 is started in step S31, the ringing pattern is changed at the start of the file receiving operation in step S11a, and the start of the reception of the sent file may be notified to the user.

The storage device R executes step S31 to shift to the state under file reception. Thereafter, when a file is not sent from the storage device S within a given time, the beep sound showing the cancelling of operation is generated, and the operation may be terminated. If the storage device S cannot find the storage device R within a given time, the beep sound showing the cancelling of operation is generated, and the operation may be terminated.

As described above, in the storage device of the present embodiment, a plurality of parameters used in the file sending and receiving operation are provided, and different tapping patterns are corresponded to each of the parameters. When the tapping pattern showing the start of the receiving operation is detected, the beep sound with the ringing pattern corresponding to the detected tapping pattern is generated, and, at the same time, the file reception is performed using the corresponding parameter. When the tapping pattern showing the start of the sending operation is detected, a file is sent using a parameter corresponding to the detected tapping pattern. When tapping synchronized with the beep sound generated by the storage device on the receiving side is performed, a parameter used in the storage device on the sending side and a parameter used in the storage device on the receiving side are combined correctly, so that the file transfer is completed normally. According to this constitution, in an environment where there are a large number of storage devices within a communicable range, for example, it is possible to reduce a percentage that a file sent from an unintended person is received incorrectly and a percentage that a file is incorrectly sent to an unintended person. Further, security can be enhanced.

In the operation example shown in FIG. 5, although the operation mode is designated by single operation (detection of the tapping pattern), the detection of tapping pattern may be divided into two stages or three or more stages. The storage device 1 determines to operate as the receiving side by the detection of the first tapping pattern (for example, detection of two times of tapping) and waits for the tapping designating the operation mode (parameter used in the receiving operation). At that time, the beep sound is generated with the ringing pattern showing the state that the storage device 1 waits for the designation of the operation mode. Thereafter, when the tapping pattern designating the operation mode is detected, the operation corresponding to the detection result is started, and the beep sound is generated with the ringing pattern corresponding to the started operation. Namely, whether the storage device 1 is operated as the file sending side or the file receiving side is determined by the first tapping operation, and the operation mode is determined by the second tapping operation. When the detection of the tapping pattern is divided into two or more stages, the number of operations that can be designated by tapping can be increased while preventing complication of the tapping pattern to be used. In this case, the cancel operation may be divided into two stages or three or more stages. Namely, when the tapping showing the cancel operation is detected after the detection of the second tapping operation of a file, the storage device 1 shifts to a state that the first tapping has been detected (a state that the storage device 1 waits for the second tapping operation). Cancelling is not performed in each stage, and there is a case in which the state of the storage device 1 is desired to be directly shifted to the power ON state (the state that neither the sending side or the receiving side is designated) by single cancel operation, and therefore, two types of tapping patterns may be defined, one of which performs cancelling in each stage, and the other of which is for the cancel operation of invalidating all the previous choices and shifting the state of the storage device 1 to the power ON state.

Third Embodiment

In the above embodiments, both the number of the storage devices on the sending side and the number of the storage devices on the receiving side are one. However, in the present embodiment, there are a plurality of storage devices on the sending or receiving side, and files are sent and received by one-to-N communication. The constitution of the storage device of the present embodiment is the same as that of the storage devices of the first and second embodiments (see, FIG. 1). Although N is assumed to be an integer not less than 2, a sequence described in the present embodiment can be applied to the case where N=1.

In the storage device 1 of the present embodiment, in addition to various operation modes described in the first and second embodiments, an operation mode for sending and receiving files one to N can be designated by user's tapping. The newly added operation mode includes a state that the storage device 1 is operated as the sending and receiving side when a file is transferred from one storage device 1 to N storage devices 1 and a state that the storage device 1 is operated as the sending and receiving side when a file is transferred from N storage devices 1 to one storage device 1. When a file is transferred from one storage device 1 to N storage devices 1, the storage device 1 on the sending side is operated as a DHCP server to allocate an IP address to each of the N storage devices 1 on the receiving side. Meanwhile, when a file is transferred from N storage devices 1 to one storage device 1, the storage device 1 on the receiving side is operated as the DHCP server to allocate an IP address to each of the N storage devices 1 on the sending side.

Figure 6:
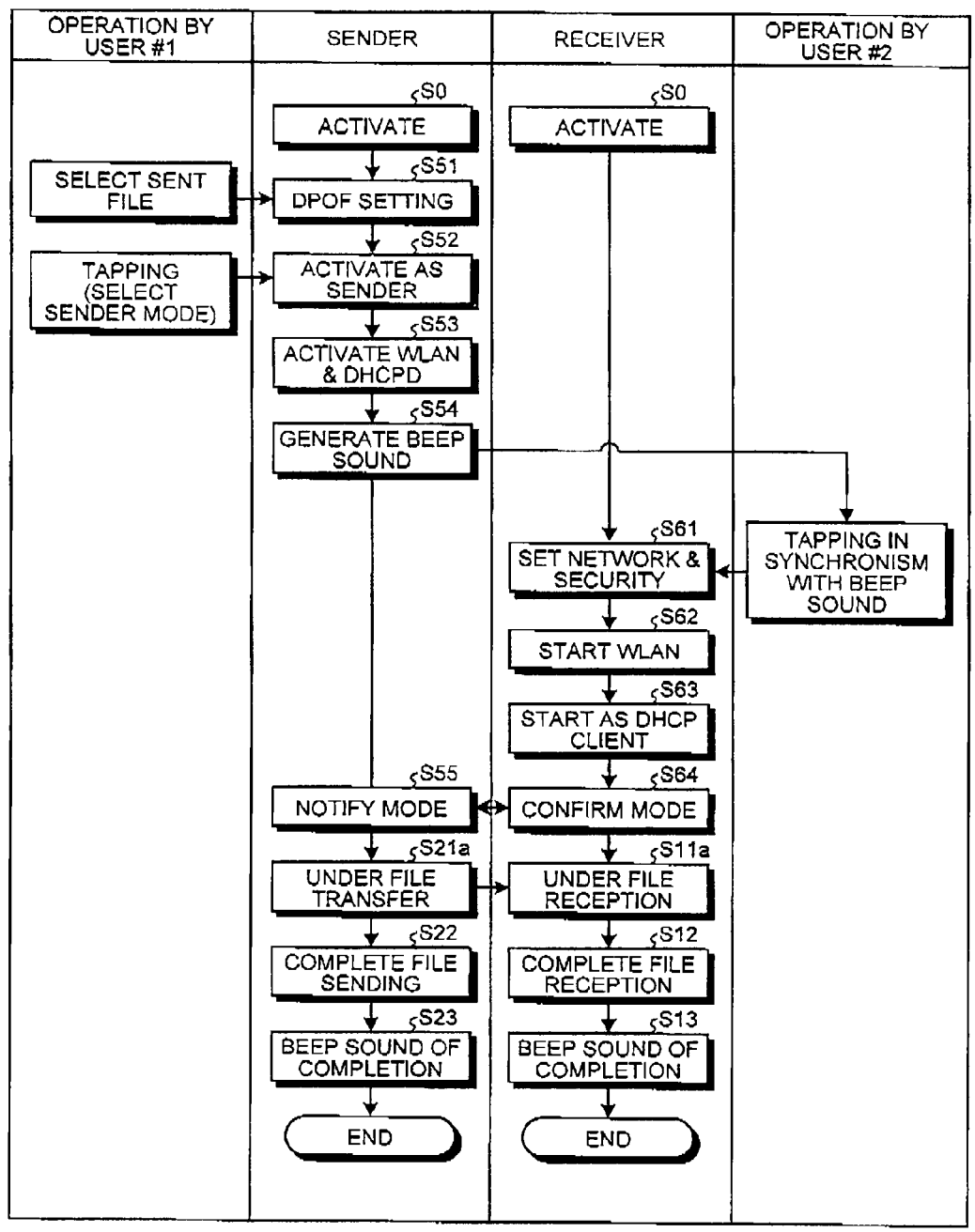
FIG. 6 is a sequence diagram showing an operation example of a storage device of a third embodiment.

FIG. 6 is a sequence diagram showing an operation example of the storage device 1 of the third embodiment. In the sequence, the number of the storage devices 1 on the sending side is one (one-to-N transfer). Although the number of the storage devices 1 on the receiving side is N, the operations of the N storage devices 1 are the same as each other. Thus, FIG. 6 shows only the operation of one of the N storage devices 1. The processing similar to that in the sequences described in the first and second embodiments (see, FIGS. 4 and 5) are assigned the same step numbers, and the description will be omitted. As in the first and second embodiments, the storage device 1 on the receiving side is referred to as the storage device R, and the storage device 1 on the sending side is referred to as the storage device S, whereby the two storage devices 1 are distinguished.

The operation example of FIG. 6 includes, as step S51, processing in which a user #1 of the storage device S selects a file to be sent. The file to be sent is selected by, for example, changing Digital Print Order Format (DPOF) setting, using functions of a digital camera mounted with the storage device S. The set value of DPOF is held by the memory 15 of the storage device S. Step S51 is not indispensable and may be omitted as in the sequences described in the first and second embodiments (see. FIGS. 4 and 5). Meanwhile, step S51 may be added to the sequences described in the first and second embodiments.

After the execution of step S51, when the storage device S detects an operation (tapping) designating the start of the operation as the sending side in the 1-to-N transfer, the storage device S starts the operation as the sending side (sender) (step S52). As in the second embodiment, a plurality of operations instructing the start of the operation as the sending side may be defined.

In the storage device S, in order to allocate the IP address to each of the storage devices R as communication counterparts, a control part 13 controls a wireless communication processing part 16. Then, the storage device S activates protocol of WLAN, for example, and, at the same time, activates DHCPD to start the operation as the DHCP server (step S53). The control part 13 controls a buzzer 11 to generate a beep sound with a ringing pattern showing that the storage device S is operated as the sending side in the one-to-N transfer (step S54).

A user of the storage device R performs tapping in synchronism with the beep sound from the storage device S. In the storage device R, when the control part 13 detects the tapping by utilizing the acceleration sensor 12, the wireless communication processing part 16 performs settings including network setting and security setting, using the parameter information corresponding to the detected tapping pattern in accordance with the instruction from the control part 13 (step S61). Further, the wireless communication processing part 16 activates the protocol of WLAN (step S62). According to this constitution, the storage device R starts the operation as a DHCP client (step S63). Then, the storage device R starts the communication with the storage device S and first receives the allocation of the IP address. Next, the control part 13 of the storage device R queries the storage device S about the operation mode to recognize whether the storage device R is operated as the sending side or the receiving side (step S64).

When the control part 13 of the storage device S receives the query in step S64, the control part 13 notifies the operation mode to the storage device R (step S55). In this case, the control part 13 notifies the fact that the storage device R should be operated as the receiving side.

Thereafter, the storage device S starts the file transfer to the storage device R in a predetermined timing, for example, at the time when a given time has elapsed from the execution of step S54 (step S21a). The storage device S extracts the file selected in step S51 to send the file to the N storage devices R. Meanwhile, when the storage device R receives the notification about the operation mode from the storage devices, the storage device R starts the file receiving operation (step S11a). The subsequent operations are similar to those in the first and second embodiments.

Figure 7:
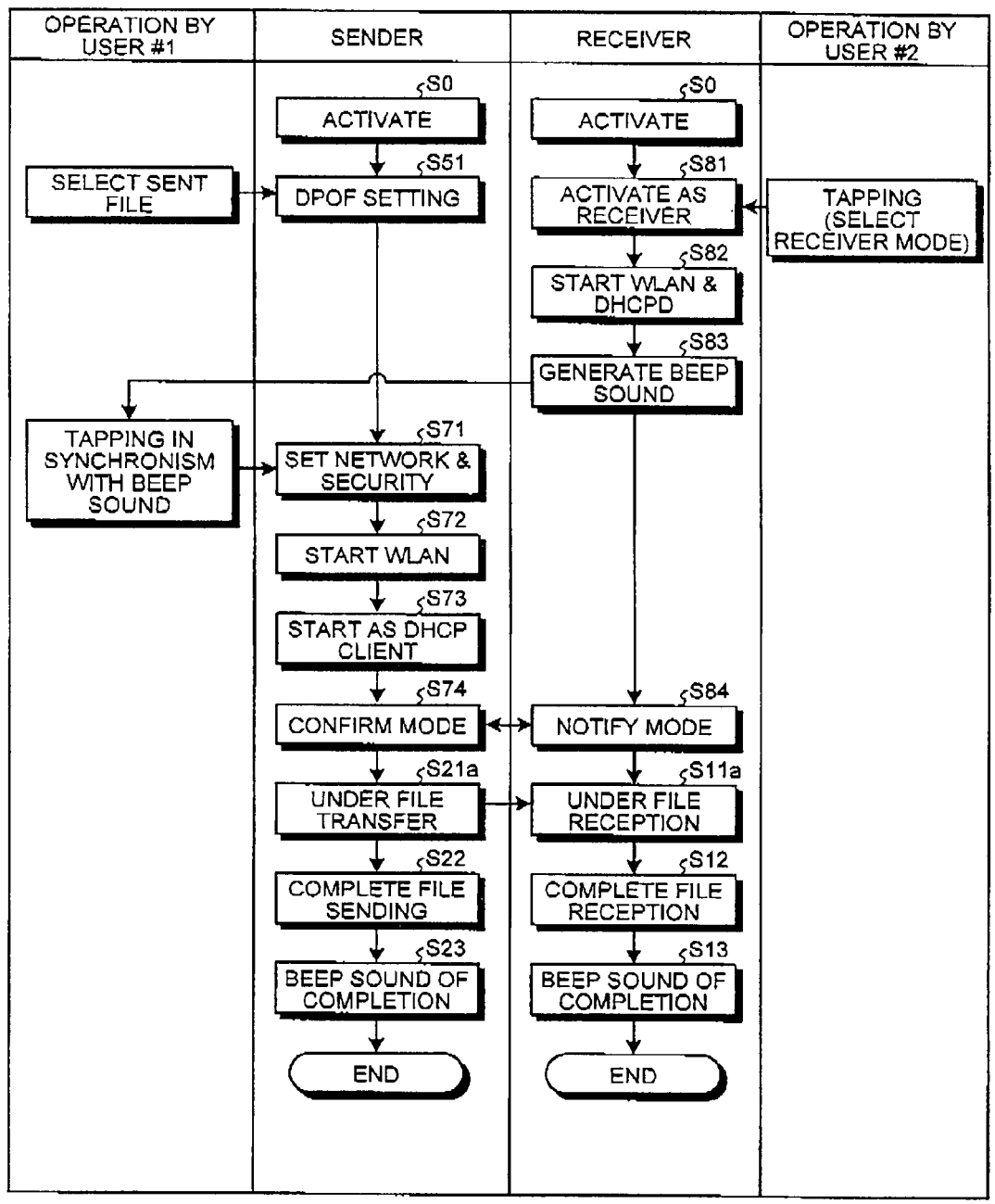
FIG. 7 is a sequence diagram showing an operation example of the storage device of the third embodiment.

FIG. 7 is a sequence diagram showing an operation example of the storage device 1 of the third embodiment. In the sequence, the number of the storage devices 1 on the receiving side (storage device R) is one (N-to-one transfer). Although the number of the storage devices 1 on the sending side (storage device S) is N, the operations of the N storage devices S are the same as each other. Thus, FIG. 7 shows only the operation of one of the N storage devices R. The processing similar to that in the sequences described in the first and second embodiments (see, FIGS. 4 and 5) and the sequence shown in FIG. 6 are assigned the same step numbers, and the description will be omitted.

When the storage device R detects an operation (tapping) designating the start of the operation as the receiving side in the N-to-one transfer, the storage device R starts the operation as the receiving side (receiver) (step S81).

In order to allocate the IP address to each of the storage devices S as communication counterparts, the storage device R activates the protocol of WLAN, for example, and, at the same time, activates DHCPD to start the operation as the DHCP server (step S82). The storage device R generates a beep sound with a ringing pattern showing that the storage device R is operated as the receiving side in the N-to-one transfer (step S83).

A user of the storage device S performs tapping in synchronism with the beep sound from the storage device R. When the storage device S detects the tapping, the storage device S performs settings including network setting and security setting, using the parameter information corresponding to the detected tapping pattern (step S71). Further, the storage device S activates the protocol of WLAN (step S72) and starts the operation as the DHCP client (step S73). Then, the storage device R starts the communication with the storage device S and first receives the allocation of the IP address. Next, the control part 13 of the storage device S queries the storage device R about the operation mode to recognize whether the storage device S is operated as the sending side or the receiving side (step S74).

When the control part 13 of the storage device R receives the query in step S74, the control part 13 notifies the mode to the storage device S (step S84). In this case, the control part 13 notifies the fact that the storage device S should be operated as the sending side. Then, the file receiving operation is started (step S11a). In the sequence shown in FIG. 7, the N-to-one transfer is assumed, and the storage device R receives the queries in step S74 at different timings from a plurality of the storage devices S. Thus, even in the state under file reception in step S11a, the storage device R monitors the presence of queries about a server mode from other storage devices S, and when the storage device R receives the query, the storage device R notifies the operation mode to the storage device S as the query sender.

The storage device R executes step S83 to start the sending of the beep sound. Thereafter, when a signal (a signal querying the operation mode, for example) from the storage device S cannot be received within a given time, the beep sound showing the cancelling of the operation is generated, and the operation may be terminated.

When the storage device S receives the notification about the operation mode from the storage device R, the storage device S starts the file sending to the storage device R (step S21a). The subsequent operations are similar to those in the first and second embodiments. The storage device S extracts the file selected in step S51 to send the file to the storage device R.

As described above, when the storage device of the present embodiment detects the tapping pattern instructing the file sending to other N (N is an integer not less than 1 or 2) storage devices, or when the storage device detects the tapping pattern instructing the file reception from other N storage devices, the storage device is operated as the DHCP server to allocate the IP address to the other storage devices as partners of the file sending or reception. The storage device performs communication using the allocated IP address to send and receive a file. This constitution can realize the one-to-N file transfer (in which the number of the storage devices on the sending side is one, and the number of the storage devices on the receiving side is N) and the N-to-one file transfer (in which the number of the storage devices on the sending side is N, and the number of the storage devices on the receiving side is one).

When the storage device on the sending side receives the designation of a file to be transferred, the storage device extracts the designated file to send the file to the storage device on the receiving side. Consequently, a user can select a necessary file from a large number of files to transfer the file to another storage device, so that the convenience can be enhanced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data transfer apparatus, which has a wireless communication processing part providing a wireless communication function and a memory, comprising:
an acceleration sensor;
a buzzer; and
a control part which detects a user's operation based on acceleration information output from the acceleration sensor and, based on the detection result, determines whether or not a file management operation including access to the memory is started and whether or not the buzzer is rung, wherein
the file management operation includes a file sending processing of sending a file to another data transfer apparatus by utilizing the wireless communication function and a file receiving processing of receiving a file from another data transfer apparatus by utilizing the wireless communication function, and
a plurality of acceleration patterns as start triggers of the file sending processing and a plurality of acceleration patterns as start triggers of the file receiving processing are specified, and when the control part controls the buzzer in a case where the file sending processing of sending a file to another data transfer apparatus is started, the control part rings the buzzer so that the ringing pattern of the buzzer coincides with any one of the specified acceleration patterns as the start triggers of the file receiving processing.

2. The data transfer apparatus according to claim 1, wherein when the detection result coincides with one of previously determined acceleration patterns, the control part starts the file management operation corresponded to the coincident acceleration pattern and, at the same time, rings the buzzer with a ringing pattern corresponding to the started operation.

3. The data transfer apparatus according to claim 1, wherein when the data transfer apparatus is operated as the sending side of the file management operation in which a file is sent from one data transfer apparatus to N (N is an integer not less than 1) data transfer apparatuses, and when the data transfer apparatus is operated as the receiving side of the file management operation in which a file is sent from N data transfer apparatuses to one data transfer apparatus, the control part allocates an IP address to the N data transfer apparatuses as communication counterparts at the start of the file management operation and sends and receives a file to and from the N data transfer apparatuses, using the allocated IP addresses.

4. The data transfer apparatus according to claim 3, wherein when the IP address is allocated to each of the N data transfer apparatuses as the communication counterparts at the start of the file management operation, a processing to be executed next is instructed to the N data transfer apparatuses, and thereafter, the file sending processing or the file receiving processing is started as a processing corresponding to the contents of the instruction.

5. The data transfer apparatus according to claim 1, wherein when the file management operation is completed, the control part rings the buzzer with a ringing pattern showing the completion of the operation.

6. The data transfer apparatus according to claim 1, wherein in such a state that the file management operation is being executed, the control part determines whether or not the operation being executed is cancelled based on the detection result.

7. The data transfer apparatus according to claim 1, wherein in the file receiving processing, the control part first monitors whether a file is sent from another data transfer apparatus, and when the file is sent within a predetermined time from the start of the monitoring, the control part rings the buzzer with a ringing pattern showing the sending of the file from the another data transfer apparatus.

8. The data transfer apparatus according to claim 7, wherein when the file is not sent within the predetermined time, the file receiving processing is cancelled.

9. The data transfer apparatus according to claim 8, wherein when the file receiving processing is cancelled, the control part rings the buzzer with a ringing pattern showing the cancellation of the file receiving processing.

10. The data transfer apparatus according to claim 1, wherein in the file sending processing, a file previously selected by a user is sent.

11. The data transfer apparatus according to claim 10, wherein the file management operation is performed in such a state that the data transfer apparatus is mounted in a digital camera, and a file designated by DPOF setting according to the digital camera is sent as the file previously selected by a user.

12. The data transfer apparatus according to claim 1, wherein in the file receiving processing, after the completion of the reception of a sent file, the completion of the reception is notified to another data transfer apparatus as a sender of the file to terminate the processing.

13. The data transfer apparatus according to claim 12, wherein when the completion of the reception is notified to another data transfer apparatus as the sender of the file to terminate the processing, the control part rings the buzzer with a ringing pattern showing the completion of the reception.

14. The data transfer apparatus according to claim 1, wherein in the file sending processing, the data transfer apparatus sends a file, and thereafter, when the data transfer apparatus receives a notification showing the completion of the reception of the file from another data transfer apparatus as a receiver of the file, the processing is terminated.

15. The data transfer apparatus according to claim 14, wherein when the data transfer apparatus receives the notification showing the completion of the file reception to terminate the file sending processing, the control part rings the buzzer with a ringing pattern showing the completion of the sending.

16. The data transfer apparatus according to claim 1, wherein the acceleration sensor outputs, as the acceleration information, the number of times acceleration of not less than a predetermined value is detected within a predetermined time.

17. The data transfer apparatus according to claim 1, wherein when the acceleration sensor detects acceleration of not less than a predetermined value again before the elapse of a predetermined time from the last detection of the acceleration of not less than the predetermined value, the acceleration sensor counts up the number of times of the detection of the acceleration, and after the detection of the acceleration of not less than the predetermined value, when a predetermined time has elapsed without the acceleration sensor detecting the acceleration of not less than the predetermined value again, the acceleration sensor outputs, as the acceleration information, the number of times of detection at the time.

18. The data transfer apparatus according to claim 1, wherein the memory is a NAND-type flash memory.

* * * * *